US008992869B2

(12) United States Patent
Ratts et al.

(10) Patent No.: US 8,992,869 B2
(45) Date of Patent: Mar. 31, 2015

(54) AMMONIA OXIDATION CATALYST SYSTEM

(71) Applicant: Caterpillar Inc., Peoria, IL (US)

(72) Inventors: Joshua L Ratts, East Peoria, IL (US);
Ronald Graham Silver, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/722,384

(22) Filed: Dec. 20, 2012

(65) Prior Publication Data

US 2014/0178273 A1 Jun. 26, 2014

(51) Int. Cl.
*B01D 53/94* (2006.01)
*B01J 33/00* (2006.01)
*F01N 3/28* (2006.01)
*B01D 53/58* (2006.01)

(52) U.S. Cl.
CPC ............ *B01D 53/9404* (2013.01); *B01D 53/58* (2013.01); *Y10S 502/50* (2013.01); *Y10S 502/52712* (2013.01); *Y10S 502/52713* (2013.01)
USPC .................. 423/213.2; 423/213.5; 423/213.7; 60/274; 60/299; 60/301; 502/325; 502/339; 502/500; 502/527.12; 502/527.13

(58) Field of Classification Search
USPC ........... 423/213.2, 213.5, 213.7; 60/274, 299, 60/301; 502/325, 339, 500, 527.12, 502/527.13
See application file for complete search history.

(56) References Cited

U.S. PATENT DOCUMENTS

| 7,576,031 | B2 | 8/2009 | Beutel et al. | |
|---|---|---|---|---|
| 7,601,662 | B2 | 10/2009 | Bull et al. | |
| 7,722,845 | B2 | 5/2010 | Caudle et al. | |
| 7,875,573 | B2 | 1/2011 | Beutel et al. | |
| 8,101,146 | B2 | 1/2012 | Fedeyko et al. | |
| 2008/0075646 | A1 | 3/2008 | Mussmann et al. | |
| 2008/0141661 | A1* | 6/2008 | Voss et al. | 60/295 |
| 2009/0173063 | A1* | 7/2009 | Boorse et al. | 60/299 |
| 2009/0180942 | A1 | 7/2009 | Caudle | |

(Continued)

FOREIGN PATENT DOCUMENTS

| WO | WO2008/106523 A2 | 9/2008 |
|---|---|---|
| WO | WO2008/132452 A2 | 11/2008 |

(Continued)

OTHER PUBLICATIONS

Cavataio et al., "Impact and Prevention of Ultra-Low Contamination of Platinum Group Metals on SCR Catalysts Due to DOC Design", *SAE Int. J. Fuels Lubr.*, vol. 2, Issue 1 (2009).

(Continued)

*Primary Examiner* — Timothy Vanoy
(74) *Attorney, Agent, or Firm* — Finnegan, Henderson, Farabow, Garrett & Dunner, LLP

(57) ABSTRACT

A treatment device configured to receive a flow of exhaust from a power source is disclosed. The treatment device may have a first layer, a second layer, and a substrate layer. The first layer may include a selective catalytic reduction layer, and the second layer may be disposed downstream of the first layer and include an oxidation catalyst support. The substrate layer may be disposed adjacent to the second layer. Additionally, an additive may be disposed downstream of the first layer. The additive may be operative to substantially prohibit migration of a component of the second layer to the first layer upon treatment of the flow of exhaust by the oxidation catalyst support.

16 Claims, 4 Drawing Sheets

(56) References Cited

U.S. PATENT DOCUMENTS

| | | |
|---|---|---|
| 2009/0180943 A1 | 7/2009 | Caudle |
| 2010/0111791 A1 | 5/2010 | Caudle |
| 2010/0111796 A1 | 5/2010 | Caudle et al. |
| 2010/0166628 A1 | 7/2010 | Soeger et al. |
| 2011/0020204 A1 | 1/2011 | Bull et al. |
| 2011/0286900 A1 | 11/2011 | Caudle et al. |
| 2013/0089481 A1* | 4/2013 | Sumiya et al. ............. 423/213.5 |
| 2013/0095013 A1* | 4/2013 | Banno et al. ............... 423/213.5 |
| 2013/0149207 A1* | 6/2013 | Castagnola et al. .......... 422/177 |
| 2013/0149221 A1* | 6/2013 | Blakeman et al. ......... 423/213.5 |
| 2013/0149222 A1* | 6/2013 | Blakeman et al. ......... 423/213.5 |

FOREIGN PATENT DOCUMENTS

| | | |
|---|---|---|
| WO | WO2009/135010 A2 | 11/2009 |
| WO | WO2012/135325 A2 | 10/2012 |

OTHER PUBLICATIONS

Kim et al., "The Effect of Pt-Pd Ratio on Oxidation Catalysts Under Simulated Diesel Exhaust", *SAE Int. J. Fuels Lubr.*, (2011).

* cited by examiner

AMMONIA OXIDATION CATALYST SYSTEM

TECHNICAL FIELD

The present disclosure is directed to an aftertreatment system and, more particularly, to an aftertreatment system having an ammonia oxidation catalyst.

BACKGROUND

Diesel engine emissions include toxic particulate matter carried with engine exhaust. The amount of particulate matter expelled from a diesel engine is regulated by environmental regulations. Many treatment systems for diesel engines, as are well known in the art, provide for removal of the particulate matter from the diesel engine emissions. Aftertreatment systems generally include a diesel particulate filter (DPF), a diesel oxidation catalyst (DOC), a selective catalytic reduction (SCR) catalyst, and an ammonia oxidation ($AMO_x$) catalyst, all placed in the exhaust gas stream of a diesel engine. The DPF captures and collects particulate matter (PM) from the engine exhaust. The DOC catalyst oxidizes nitrogen oxide (NO) to nitrogen dioxide ($NO_2$). The SCR catalyst is used to convert oxides of nitrogen ($NO_x$) and ammonia ($NH_3$) to nitrogen gas ($N_2$) and water ($H_2O$). However, if excess $NH_3$ is introduced into the exhaust stream upstream of the SCR catalyst, "ammonia slip" may occur, resulting in some $NH_3$ being carried out with the exhaust, if not all the $NH_3$ is converted by the SCR catalyst. The $AMO_x$ catalyst helps to reduce ammonia slip by converting the excess $NH_3$ to $N_2$ and $H_2O$.

The AMOx catalyst may age and degrade over time. An aged catalyst may have reduced operability and may not convert all of the excess $NH_3$ to $N_2$. This may contribute to ammonia slip, resulting in $NH_3$ released into the atmosphere with the exhaust. $NH_3$ may be hazardous when released in the atmosphere and may be caustic to other materials.

An exemplary treatment system is described in U.S. Pat. No. 7,722,845 that issued to Caudle et al. on May 25, 2010 (the '845 patent). The system of the '845 patent comprises an $AMO_x$ catalyst containing platinum to efficiently convert $NH_3$. However, the system of the '845 patent is not configured to impede the various operational factors that contribute to AMOx catalyst aging. Therefore, the useful life of the AMOx catalyst described in the '845 patent may be relatively short compared to the other components of the treatment system. As a result, the system of the '845 patent may fail to convert all the $NH_3$ when the catalyst has aged.

The disclosed system is directed to overcoming one or more of the problems set forth above and/or other problems of the prior art.

SUMMARY

The present disclosure is directed to a treatment device configured to receive a flow of exhaust from a power source. The treatment device may include first and second layers, such that the first layer includes a selective catalytic reduction layer and the second layer includes an oxidation catalyst support. The second layer may be disposed downstream of the first layer, and a substrate layer may be disposed adjacent to the second layer. Additionally, an additive may be disposed downstream of the first layer. The additive may be operative to substantially prohibit migration of a component of the second layer to the first layer upon treatment of the flow of exhaust by the oxidation catalyst support.

The present disclosure is directed to a method of treating exhaust from a power source. The method may include directing exhaust through a first layer of a treatment device to a second layer of the treatment device. The first layer may include a selective catalytic reduction layer and the second layer may catalytically oxidize at least a portion of the exhaust at the second layer. The oxidized portion of the exhaust may be directed from the second layer to the first layer. The method may further include directing exhaust through an additive disposed downstream of the first layer. The additive may substantially prohibit migration of a component of the second layer to the first layer upon passage of the oxidized portion of the exhaust from the second layer to the first layer.

DETAILED DESCRIPTION

Figure 1:
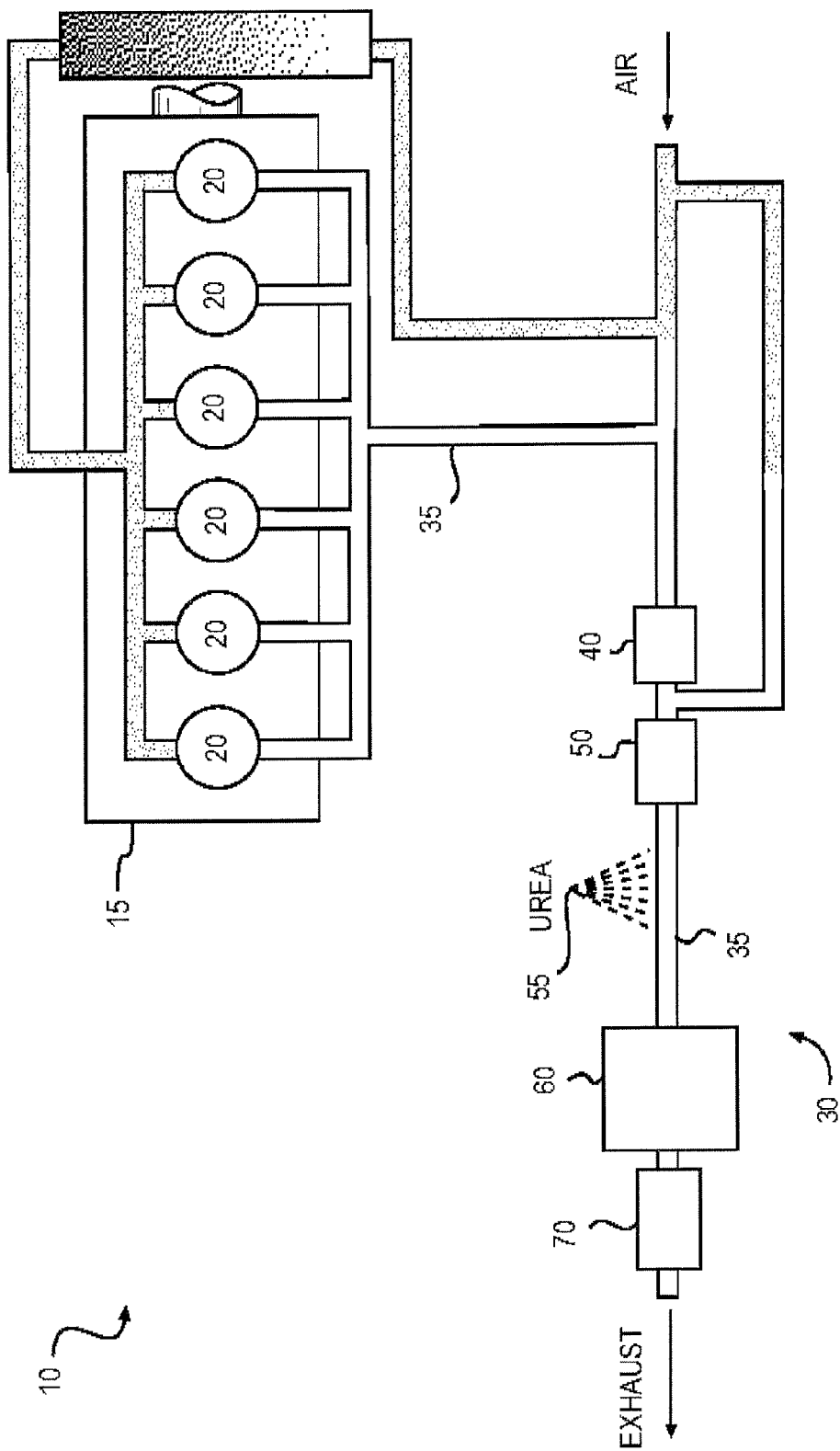
FIG. 1 is a diagrammatic and schematic illustration of an exemplary treatment system.

FIG. 1 illustrates an exemplary disclosed power system 10 having an exhaust treatment system 30. It is contemplated that power system 10 may embody any type of combustion engine, such as, for example, a gas or diesel internal combustion engine. Power system 10 may include an engine block 15 defining a plurality of cylinders 20. A plurality of piston assemblies (not shown) may be disposed within cylinders 20 to form combustion chambers.

Exhaust treatment system 30 may include a passageway 35 that directs an exhaust gas stream from cylinders 20 to the atmosphere. Passageway 35 may include multiple components to treat constituents in the exhaust gas. For example, passageway 35 may include a particulate filter 40, a first oxidation catalyst 50, a reduction catalyst 60, and a second oxidation catalyst 70. Additionally, it is contemplated that exhaust treatment system 30 may include various other components (not shown), including one or more turbines, an active regeneration device, bypass components, exhaust gas recirculation components, exhaust compression or restriction brakes, additional exhaust treatment devices, and any other known components, if desired.

Particulate filter 40 may remove particulate matter from the exhaust gas stream. First oxidation catalyst 50 may be located upstream or downstream of particulate filter 40. In exemplary embodiments, particulate filter 40 may comprise a DPF, and first oxidation catalyst 50 may comprise a DOC configured to oxidize $NO_x$. A gaseous or liquid reductant may be introduced into the exhaust gas stream by injector 55, downstream of first oxidation catalyst 50. For example, the reductant may include urea or a urea/water mixture that may evaporate to $NH_3$. The $NH_3$ may combine with the exhaust gas stream and enter reduction catalyst 60.

In one exemplary embodiment, reduction catalyst 60 may comprise an SCR catalyst, and in such embodiments, the reduction catalyst 60 may be configured to reduce $NO_x$ and $NH_3$ into $N_2$ and $H_2O$. The exhaust gas stream, including $N_2$, may then be directed from passageway 35 and into the atmosphere.

An "ammonia slip" may occur when injector 55 introduces too much urea and some $NH_3$ is not converted into $N_2$. Therefore, this $NH_3$ may pass through exhaust treatment system 30 and into the atmosphere. Second oxidation catalyst 70 may be located downstream of reduction catalyst 60 and may be operative to treat such ammonia slip. Specifically, second oxidation catalyst 70 may be configured to catalytically oxidize the $NH_3$ and/or other reductants. In one exemplary embodiment, second oxidation catalyst 70 may comprise an $AMO_x$ catalyst.

Figure 2:
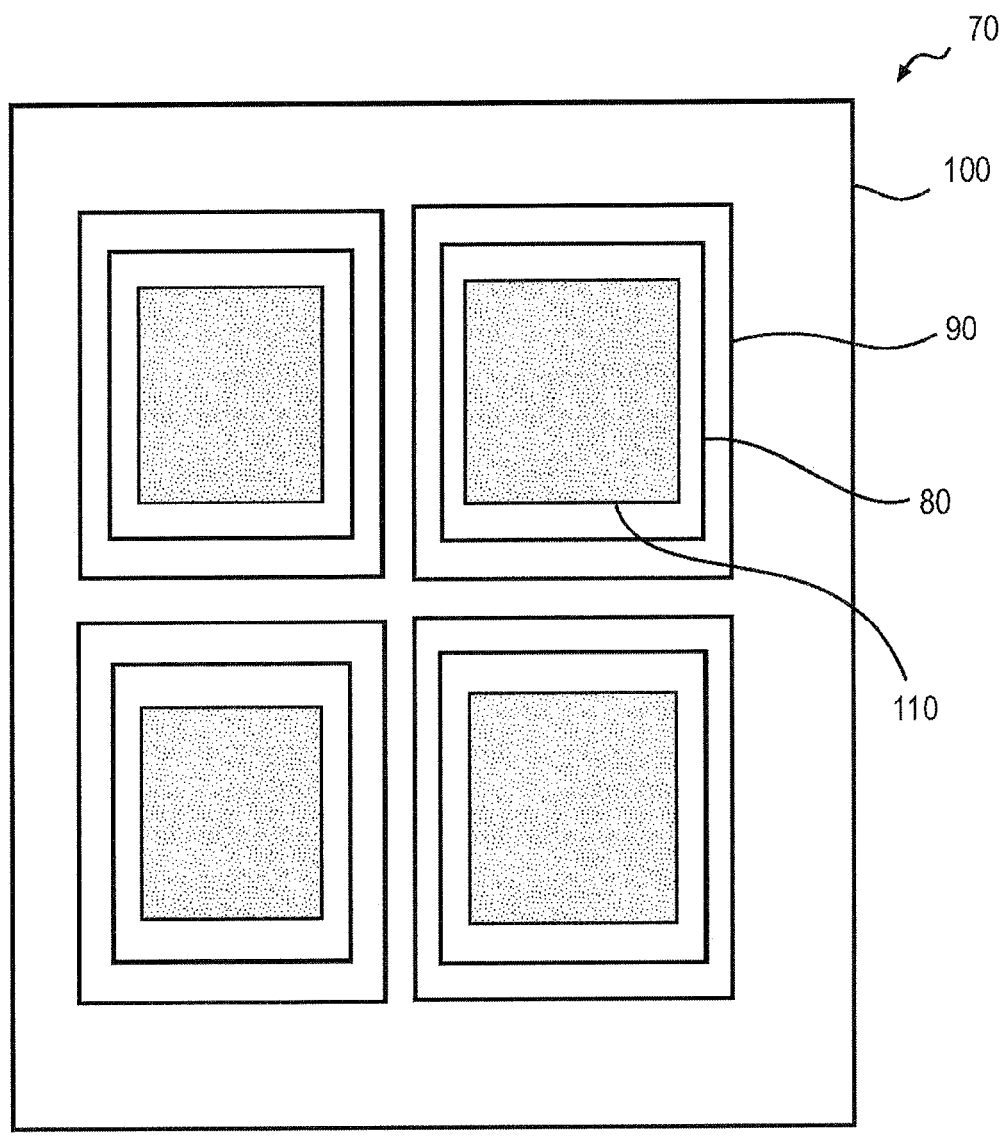
FIG. 2 is a schematic illustration of a partial cross-section of an exemplary disclosed AMOx catalyst that may be used with the treatment system of FIG. 1.

FIG. 2 illustrates a partial cross-section of an exemplary disclosed second oxidation catalyst 70 including a first layer 80, a second layer 90, and a third layer 100. The layers may be deposited upon and/or chemically mixed with each other. In an exemplary embodiment, third layer 100 may form multiple pathways 110, in which the first and second layers 80, 90 are deposited. Pathways 110 may comprise separate flow channels of third layer 100, and one or more such pathways 110 may include inlets and outlets through which the exhaust gas stream flows. First layer 80 may be disposed internal to second layer 90, such that the exhaust gas stream flowing within passageway 35 may enter, flow across, pass through, and/or otherwise interact with first layer 80 before it interacts with second layer 90.

In an exemplary embodiment, first layer 80 may comprise an SCR layer including at least one SCR catalyst material. In one embodiment, such SCR catalyst materials may include a zeolite component, for example a metal element deposited onto a porous aluminosilicate. The metal element may include a metal from one of the groups VB, VIIB, VIIIB, IB, or IIB of the periodic table. Specifically, the metal element may comprise copper and/or iron. In an exemplary embodiment, first layer 80 may comprise a copper-zeolite catalyst. Additionally or alternatively, first layer 80 may include vanadium oxide, tungsten oxide, and/or molybdenum oxide deposited onto titanium oxide.

In an exemplary embodiment, second layer 90 may comprise a DOC layer including at least one DOC catalyst material. In one embodiment, DOC catalyst materials may include a coating component located on an oxidation catalyst support. In some embodiments, second layer 90 may include the coating component and an additive located on the oxidation catalyst support. Therefore, the coating component and additive may each form a component of second layer 90. It is contemplated that the oxidation catalyst support may include aluminum oxide ($Al_2O_3$), and both the coating component and the additive may include metals. Specifically, the coating component may include platinum and the additive may include a precious metal, including but not limited to palladium and/or cerium.

In one exemplary embodiment, third layer 100 may form an outermost layer of second oxidation catalyst 70 and may be disposed adjacent to second layer 90. Third layer 100 may comprise a flow-through substrate, including but not limited to a metal or ceramic honeycomb structure suitable to allow the exhaust gas stream to contact first and second layers 80, 90. Third layer 100 may be made of any suitable material including, but not limited to, cordierite, cordierite-α alumina, silicon nitride, zircon mullite, spodumente, alumina-silica magnesia, zircon silicate, sillimanite, magnesium silicates, zircon, petalite, α alumina, and aluminosilicates.

Figure 3:
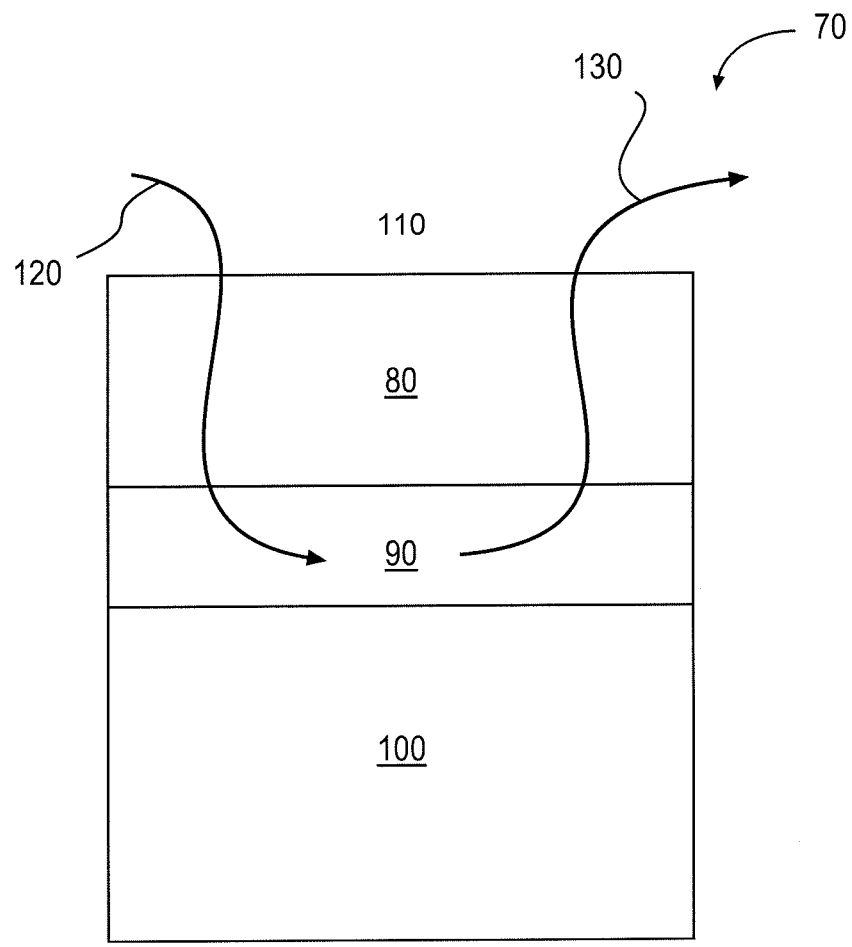
FIG. 3 is a schematic illustration of another partial cross-section of the exemplary disclosed AMOx catalyst of FIG. 1.

FIG. 3 illustrates an additional partial cross-section of the second oxidation catalyst 70 of FIG. 2. As shown in FIG. 3, first layer 80 may be disposed between pathway 110 and second layer 90, such that second layer 90 may be disposed downstream of first layer 80. Therefore, first layer 80 may be configured to interact with an inflowing exhaust gas stream 120 before second layer 90. Third layer 100 may be configured such that inflowing exhaust gas stream 120 cannot enter, flow across, pass through, and/or otherwise interact with this layer. The first and second layers 80, 90 may also be configured such that an outflowing exhaust gas stream 130 may interact with second layer 90 prior to interaction with first layer 80. Outflowing exhaust gas stream 130 may interact with first layer 80 before it exits second oxidation catalyst 70.

Figure 4:
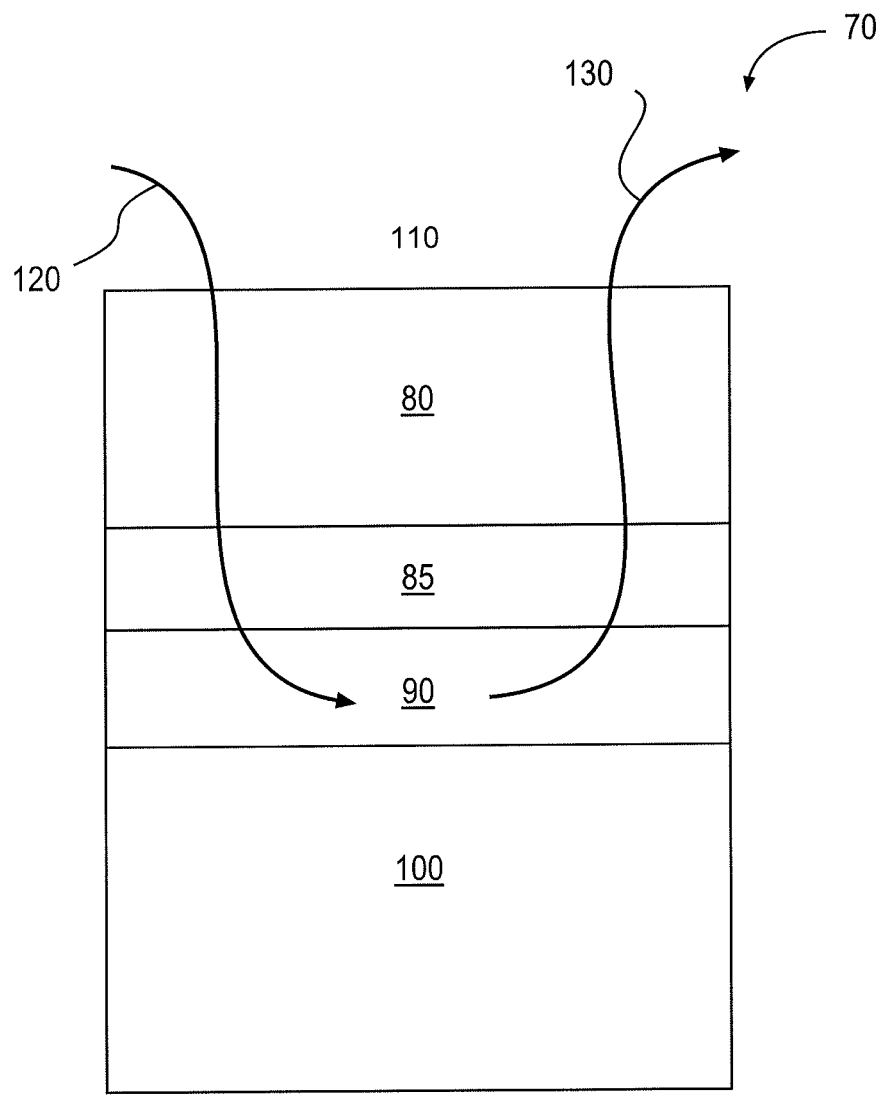
FIG. 4 is a schematic illustration of a partial cross-section of another exemplary disclosed AMOx catalyst that may be used with the treatment system of FIG. 1.

FIG. 4 illustrates a partial cross-section of another exemplary second oxidation catalyst 70. The exemplary second oxidation catalyst 70 shown in FIG. 4 may comprise at least four layers, including first layer 80, second layer 90, and third layer 100, as discussed above. Additionally, the exemplary second oxidation catalyst 70 of FIG. 4 may include fourth layer 85, which may contain an additive. In one embodiment, the additive may include an oxidation catalyst support, for example, $Al_2O_3$, and/or any other like oxidation catalyst support.

Fourth layer 85 may be disposed downstream of first layer 80 and located between first layer 80 and second layer 90. Therefore, first layer 80 may be configured to receive inflowing exhaust gas stream 120 before fourth layer 85 and second layer 90. Third layer 100 may be configured such that inflowing exhaust gas stream 120 cannot enter or pass there through. The layers 80, 85, 90, 100 may also be configured such that outflowing exhaust gas stream 130 may interact with second layer 90 prior to interaction with fourth layer 85 or first layer 80. Outflowing exhaust gas stream 130 may interact with fourth layer 85 prior to interaction with first layer 80, and outflowing exhaust gas stream 130 may interact with first layer 80 before exiting second oxidation catalyst 70.

Industrial Applicability

The disclosed power system 10 may provide a durable exhaust treatment system 30 with an increased useable life. The exhaust treatment system 30 may include an oxidation catalyst system that efficiently oxidizes $NH_3$ in the exhaust gas stream for an extended period of time. In exemplary embodiments, the exhaust treatment system 30 may be configured to resist degradation of the ability of second oxidation catalyst 70 to oxidize ammonia. Such degradation may be caused by, among other things, the migration of platinum from second layer 90 to first layer 80, or platinum sintering within second layer 90 of second oxidation catalyst 70. Operation of the exhaust treatment system 30 will now be described in detail.

During operation, an exhaust gas stream may be directed from engine block 15 and through passageway 35 of exhaust treatment system 30. The exhaust gas stream may flow through particulate filter 40, and particulate filter 40 may capture, collect, and/or otherwise remove particulate matter from the exhaust gas stream. The exhaust gas stream may then flow across first oxidation catalyst 50, and first oxidation catalyst 50 may oxidize $NO_x$ present in the exhaust gas stream. A reductant such as urea solution may be introduced into the exhaust gas stream before the stream enters reduction catalyst 60. In the presence of this reductant, reduction catalyst 60 may reduce $NO_x$ and $NH_3$ in the exhaust gas stream to $N_2$ and $H_2O$.

The exhaust gas stream may enter second oxidation catalyst 70 downstream of reduction catalyst 60. Second oxidation catalyst 70 may convert any excess $NH_3$ to $N_2$ and $H_2O$. Power system 10 may then emit the exhaust gas stream from passageway 35 and into the atmosphere.

In the embodiment of FIG. 3, second oxidation catalyst 70 includes an $AMO_x$ catalyst and may direct the exhaust gas stream through pathways 110 formed in third layer 100. As the exhaust gas stream flows within pathways 110, the exhaust gas stream may interact with first and second layers 80, 90. Specifically, second oxidation catalyst 70 may direct inflowing exhaust gas stream 120 into the catalyst and across first layer 80 (FIG. 3). Next, second oxidation catalyst 70 may direct the exhaust from first layer 80 and across second layer 90, where second layer 90 may catalytically oxidize at least a portion of the exhaust at second layer 90. This catalytic oxidation process may convert excess $NH_3$ to $N_2$.

Outflowing exhaust gas stream 130 may include the catalytically oxidized portion of the exhaust. As shown in FIG. 3, outflowing exhaust gas stream 130 may flow across second layer 90 and then back across first layer 80. The exhaust gas stream may continuously flow into and out of first and second layers 80, 90 before the exhaust gas streams exits second oxidation catalyst 70.

As described above, in the embodiment shown of FIG. 3, first layer 80 may include a copper-zeolite catalyst and second layer 90 may include an ammonia oxidation catalyst. Specifically, the ammonia oxidation catalyst may contain a platinum coating component and a palladium additive adhered to $Al_2O_3$. The platinum and $Al_2O_3$ may be chemically bonded together. Additionally, the palladium additive may interact with the platinum in the second layer 90 to form a relatively strong chemical bond. Such a bond may include, for example, a "bimetallic phase," and/or any other like chemical bond. Such a bimetallic phase may stabilize the platinum during interaction with the exhaust and may substantially secure it within second layer 90.

As shown in the embodiment of FIG. 3, second oxidation catalyst 70 may direct the exhaust gas stream through the platinum and palladium when the exhaust stream flows across second layer 90. In traditional systems, upon passage of the catalytically oxidized exhaust from second layer 90 to first layer 80, the platinum may migrate from second layer 90 to first layer 80. However, the bimetallic phase formed between the platinum and palladium of the present disclosure may stabilize the platinum, and may substantially prevent such migration. Therefore, the palladium additive may be operative to substantially secure the platinum in second layer 90. This may allow the platinum to remain disposed within second layer 90 as exhaust treatment system 30 is utilized over time.

Additionally, as shown in the embodiment of FIG. 3, stabilization of the platinum may substantially reduce sintering of the platinum within second layer 90. The bimetallic phase, formed between platinum and palladium, may produce a strong chemical bond between platinum and oxidation catalyst support ($Al_2O_3$) in second layer 90. Therefore, the bimetallic phase may secure the platinum in second layer 90 and decrease its sintering rate.

As shown in the embodiment of FIG. 4, second oxidation catalyst 70 includes an $AMO_x$ catalyst and inflowing exhaust gas stream 120 may flow across at least three layers. Specifically, oxidation catalyst 70 may direct inflowing exhaust gas stream 120 across first layer 80, across fourth layer 85, and then across second layer 90. Additionally, second layer 90 may catalytically oxidize at least a portion of the exhaust at second layer 90. Second oxidation catalyst 70 may direct the catalytically oxidized exhaust gas stream across second layer 90, across fourth layer 85, and then back across first layer 80.

As described above, in the embodiment of FIG. 4, first layer 80 may include a copper-zeolite catalyst and second layer 90 may include an ammonia oxidation catalyst. Specifically, the ammonia oxidation catalyst may contain a platinum coating component adhered to $Al_2O_3$. The platinum and $Al_2O_3$ may be chemically bonded together. Fourth layer 85 may include an $Al_2O_3$ additive.

As illustrated in the embodiment of FIG. 4, second oxidation catalyst 70 may direct the exhaust gas stream through the $Al_2O_3$ additive when the exhaust stream flows across fourth layer 85. In traditional systems, upon passage of the catalytically oxidized exhaust from second layer 90 to first layer 80, the platinum component may migrate from second layer 90 to first layer 80. However, the $Al_2O_3$ additive in fourth layer 85 of the present disclosure, may substantially prohibit such migration of the platinum. For example, platinum migrating from second layer 90 may become deposited within fourth layer 85 and thus unable to migrate further to first layer 80. Therefore, the $Al_2O_3$ additive in fourth layer 85 may be operative to substantially secure the platinum, preventing the platinum from migrating to first layer 80.

The present disclosure provides a durable ammonia oxidation catalyst system that substantially secures platinum within an oxidation catalyst. Specifically, the ammonia oxidation catalyst system prevents migration and sintering of the platinum. This may reduce emissions for an extended period of time and extend the useable life of the catalyst. Additionally, the oxidation catalyst system of the present disclosure may result in increased efficiency, thus providing compact designs and cost savings. Furthermore, the oxidation catalyst of the present disclosure may operate in power systems having extremely hot exhaust (e.g. temperatures above 650° C.).

It will be apparent to those skilled in the art that various modifications and variations can be made to the system of the present disclosure. Other embodiments of the system will be apparent to those skilled in the art from consideration of the specification and practice of the method and system disclosed herein. It is intended that the specification and examples be considered as exemplary only, with a true scope of the disclosure being indicated by the following claims and their equivalents.

What is claimed is:

1. A treatment device configured to receive a flow of exhaust from a power source, the treatment device comprising:
 a first layer including a selective catalytic reduction layer;
 a second layer disposed downstream of the first layer and including an oxidation catalyst support;
 a substrate layer disposed adjacent to the second layer; and
 an additive disposed between the first and second layers,
  wherein the additive is operative to substantially prohibit migration of a component of the second layer to the first layer upon treatment of the flow of exhaust by the oxidation catalyst support.

2. The treatment device of claim 1, wherein the component of the second layer comprises platinum.

3. The treatment device of claim 2, wherein the component of the second layer is chemically bonded to aluminum oxide in the second layer.

4. The treatment device of claim 1, wherein the additive comprises a precious metal.

5. The treatment device of claim 4, wherein the precious metal comprises one of palladium and cerium.

6. The treatment device of claim 1, wherein the additive comprises a component of the second layer.

7. The treatment device of claim 1, wherein the additive comprises aluminum oxide.

8. The treatment device of claim 1, wherein the additive comprises at least one of aluminum oxide and a precious metal disposed between the first layer and the substrate layer.

9. A treatment device configured to receive a flow of exhaust from a power source, the treatment device comprising:

a first layer including a selective catalytic reduction layer;

a second layer including platinum, the second layer being disposed downstream of the first layer and configured to catalytically oxidize exhaust passing from the first layer to the second layer;

a substrate layer disposed adjacent to the second layer; and an additive disposed between the first layer and the second layer and comprising aluminum oxide, wherein the additive is operative to substantially prohibit migration of platinum from the second layer to the first layer upon passage of catalytically oxidized exhaust from the second layer to the first layer.

10. The treatment device of claim 9, wherein the additive comprises a precious metal including one of palladium and cerium.

11. The treatment device of claim 9, wherein the additive comprises a component of the second layer.

12. The treatment device of claim 9, wherein the additive comprises at least one of aluminum oxide and a precious metal disposed between the first layer and the substrate layer.

13. The treatment device of claim 9, wherein the treatment device comprises an ammonia oxidation catalyst disposed downstream of a selective reduction catalyst, the selective reduction catalyst configured to catalytically reduce nitrogen oxide in the flow of exhaust in the presence of a reductant, the ammonia oxidation catalyst configured to catalytically oxidize the reductant.

14. A method of treating exhaust from a power source, comprising:

directing exhaust through a first layer of a treatment device to a second layer, the first layer including a selective catalytic reduction layer, the second layer including platinum;

catalytically oxidizing at least a portion of the exhaust at the second layer;

directing the oxidized portion of the exhaust from the second layer to the first layer; and directing exhaust through a layer of aluminum oxide disposed between the first and second layers, the additive substantially prohibiting migration of the platinum of the second layer to the first layer upon passage of the oxidized portion of the exhaust from the second layer to the first layer.

15. A treatment device configured to receive a flow of exhaust from a power source, the treatment device comprising:

a first layer including a selective catalytic reduction layer;

a second layer including platinum and aluminum oxide, the second layer being disposed downstream of the first layer and configured to catalytically oxidize exhaust passing from the first layer to the second layer;

a substrate layer disposed adjacent to the second layer; and an additive disposed between the first layer and the substrate layer, wherein the additive is operative to substantially prohibit sintering of platinum in the second layer, and migration of a component of the second layer from the second layer to the first layer upon passage of catalytically oxidized exhaust from the second layer to the first layer.

16. A method of treating exhaust from a power source, comprising:

directing exhaust through a first layer of a treatment device to a second layer, the first layer including a selective catalytic reduction layer, and the second layer including platinum;

catalytically oxidizing at least a portion of the exhaust at the second layer;

directing the oxidized portion of the exhaust from the second layer to the first layer; and directing exhaust through an additive disposed downstream of the first layer, the additive substantially prohibiting sintering of the platinum of the second layer, and substantially prohibiting migration of a component of the second layer to the first layer upon passage of the oxidized portion of the exhaust from the second layer to the first layer.

* * * * *